United States Patent
Fangmeier et al.

[11] Patent Number: 5,921,068
[45] Date of Patent: *Jul. 13, 1999

[54] FLOW PACK MACHINE WITH AT LEAST TWO TRANSVERSE SEALING JAWS

[75] Inventors: Reinhard Fangmeier, Wetzlar; Wolfgang Kauss, Grünberg-Seenbrücke; Reinmar Schaller, Wetzlar-Münchholzhausen, all of Germany

[73] Assignee: Hassia-Redatron GmbH, Huttenberg-Rechtenbach, Germany

[*] Notice: This patent is subject to a terminal disclaimer.

[21] Appl. No.: 09/034,237

[22] Filed: Mar. 4, 1998

[30] Foreign Application Priority Data

Mar. 4, 1997 [DE] Germany .................. 297 03 924 U

[51] Int. Cl.⁶ .................................................. B65B 9/06
[52] U.S. Cl. .................................... 53/551; 53/374.5
[58] Field of Search ................ 53/374.5, 374.6, 53/374.3, 375.4, 551, 554, 234; 156/308.4, 309.6; 198/475.1, 797

[56] References Cited

U.S. PATENT DOCUMENTS

| | | | |
|---|---|---|---|
| 5,203,145 | 4/1993 | Kammler et al. | 53/554 |
| 5,622,033 | 4/1997 | Fukuda | 53/554 |
| 5,669,201 | 9/1997 | Simionato | 53/551 |
| 5,685,131 | 11/1997 | Spatolisano et al. | 53/374.6 |
| 5,753,067 | 5/1998 | Fukuda et al. | 53/374.6 |
| 5,778,641 | 7/1998 | Simionato | 53/551 |

FOREIGN PATENT DOCUMENTS 1364564  9/1971  United Kingdom ..................... 53/554

*Primary Examiner*—Linda Johnson
*Assistant Examiner*—Matthew Luby
*Attorney, Agent, or Firm*—Antonelli, Terry, Stout & Kraus, LLP

[57] ABSTRACT

A flow pack machine has at least two transverse sealing jaws, which are arranged on opposite sides of a film tube to be sealed on in each case one jaw carrier, which revolves cyclically at least approximately on circular paths and can be engaged on and separated from one another, the jaw carriers being in each case mounted in rotary manner on at least one guide rod and the latter is fixed to a rotary shaft mounted in a bearing wall. There is also a first toothed belt wheel (19, 19'), traversed by the rotary shaft (15, 15'), located on the bearing wall (17), and a second toothed belt wheel (12, 12') fixed to the jaw carrier (7, 7') and which are interconnected in rotation by means of an endless, closed toothed belt (20).

13 Claims, 5 Drawing Sheets

FLOW PACK MACHINE WITH AT LEAST TWO TRANSVERSE SEALING JAWS

FIELD OF THE INVENTION

The invention relates to a flow pack machine with at least two transverse sealing jaws, which are positioned at opposite sides of a film tube to be sealed on in each case one jaw carrier, which cyclically rotates at least approximately on circular paths and which can be applied to and separated from one another, the jaw carriers being in each case mounted in rotary manner on at least one guide rod and the latter is connected in fixed manner to a rotary shaft mounted in a bearing wall.

BACKGROUND OF THE INVENTION

Flow pack machines for the manufacture, filling and welding of film tubes are known both as continuous and clocked operating machines. In the case of continuously operating flow pack machines tube transfer takes place continuously without any stoppage and pack welding takes place with the film tube moving. However, in the case of clocked operating flow pack machines, transverse welding of the pack takes place with the film tube stationary. Longitudinal welding of the pack can take place with the film tube stationary or moving.

The transverse welding of the pack takes place by means of transverse sealing jaws, whilst in the case of flow pack machines with a clocked operation there is only a movement of the transverse sealing jaws towards and away from one another perpendicular to the film tube. In the case of vertical flow pack machines with a continuous operation, the transverse sealing jaws are moved along predetermined paths from a lower-lying welding location to a higher-lying welding location on the film tube and then moves downwards together with said film tube, performing the welding process.

In order to maintain the transverse sealing jaws on this path curve, EP-Bl-368 095 discloses a flow pack machine, in which the transverse sealing jaws are in each case guided in rotating manner on a closed, substantially circular curved sector or cam path, which is linear on the side facing the film tube. As a result, in the vicinity of the linear curved sector, the film tube is engaged and guided downwards by the parallel oriented clamping surfaces of the transverse sealing jaws, the clamping surfaces being kept parallel to one another by the curved sector throughout the sealing period. As the film tube is consequently clamped on a very long, straight path between the transverse sealing jaws, this permits a reliable sealing of difficultly processable materials. However, it is disadvantageous that the transverse sealing jaw on passing between circular and straight curved sectors is so bent with respect to the film tube that the transverse sealing jaws initially only engage with their edges on the film, so that there is an extremely high risk of overheating of the film tube in this area.

Therefore flow pack machines have been provided, in which the transverse sealing jaws are only displaced parallel to themselves throughout the rotary movement, so that their welding faces always face the film tube. Such a flow pack machine is known from German patent 27 51 928. The transverse sealing jaws are resiliently mounted on continuously rotating wheels, each wheel having three parallel disks and the jaw holders are mounted between two equiaxially arranged disks with aligned bearing points, whilst the third disk with a displaced shaft is arranged adjacent to one of the two disks and forms the displaced bearing point of the jaw holder. By means of the said two oppositely displaced bearing points the transverse sealing jaws perform a purely translatory movement and are maintained in this movement, so that they are always oriented parallel to themselves and in particular in the horizontal position. Consequently there are no relative pivoting movements of the sealing elements and their carriers, so that from the outset the transverse sealing jaws engage with their entire heating surface on the film tube and there is no burning of the film tube material. In order to transfer the rotary movement to the mechanism comprising wheels and transverse sealing jaws on the opposite side of the film tube, the disks forming the bearing points for the jaw holder mesh with the disks of the opposing mechanism. As a result of an elastic sleeve or sliding bearing of the sealing parts of the transverse sealing jaws by means of a compression spring the necessary sealing pressure is applied to the film tube to be sealed.

It is disadvantageous in this intrinsically satisfactorily operating flow pack machine that a complicated construction is necessary for ensuring the maintaining parallel of the transverse sealing jaws and for transferring the rotary movement to the opposite sealing mechanisms. As a result of the fact that e.g. several disks mesh with one another for the transfer of the rotary movement, it is not possible to easily modify the pivot pins of both sealing mechanisms. The same applies with respect to the replacement of the mutually meshing disks in the case of damage, particularly since within said disks are located the bearing points for the jaw holders and consequently the transverse sealing jaws. In the case of different materials for the film tube it is also not easily possible to adjust the contact pressure, because the sealing mechanism is supported by means of the spring on a plunger, which is guided in the jaw holder and equipped with a roller, which engages with a fixed cam located in the area of the vertical working section and which maintains stationary the plunger and consequently the sealing mechanism in the horizontal direction, which leads to a constant pressure of the sealing part of the transverse sealing jaw. In the case of other web materials it is then necessary to interchange the cams and/or at least the springs, in order to be able to correspondingly adapt the sealing pressure.

The problem of the invention is consequently to so improve a flow pack machine of the aforementioned type that, with a simplified construction and operationally reliable functioning, the maintaining parallel of the heating surfaces of the transverse sealing jaws is ensured over the entire circular path and there is a precise guidance thereof in the area of the working section.

SUMMARY OF THE INVENTION

According to the invention the set problem is solved with a flow pack machine of the aforementioned type, which is characterized by a first toothed belt wheel fixed on the bearing wall and traversed by the rotary shaft and a second toothed belt wheel fixed on the jaw carrier and which by means of an endless, closed toothed belt are in mutual rotary connection. The first wheel is a sun wheel and the second wheel a planet wheel, which apart from being rotatable about its own shaft is also rotatable about the shaft traversing the first sun wheel. The rotation about its own shaft is brought about by the endless, closed tooth belt. It has in fact surprisingly been found that such a belt transmission is sufficient for a parallel orientation of the sealing jaws in space. The sealing jaws are always displaced parallel to themselves on the circular paths traversed by the jaw carriers, so that their welding faces or heating faces always face the film tube. As a result of this parallel movement of the transverse sealing jaws they advantageously engage on the film tube in the working section. They consequently engage from the outset with their entire heating surface, so that as no tilting or canting occurs, there can be no burning of the material used. The maintaining parallel in space of the sealing jaws is brought about as a result of the inventive belt transmission because the planet wheel performs a rotary movement in opposition to the rotary movement of the jaw carrier.

As a result of the inventive construction there is no longer a need for complicated bearing points for crank arms or guide rods of the jaw carrier, because the orientation merely takes place by means of the two toothed belt wheels and the toothed belt. These components are also easily replaceable when damage or wear occurs. Such a belt transmission can also be more easily implemented and is quieter than the guides used hitherto.

For a space-saving arrangement of the toothed belt wheels they are placed in alignment with one another between the bearing wall and guide rod. The guide rod is then traversed by the jaw carrier, said guide rod being fixed in known manner on the pivot pin for said sealing device or said sealing mechanism. Thus, there is only a single guide rod on the side of the transverse sealing jaw and not two guide rods as in the prior art, whereof one has to be doubly mounted. The construction according to the invention consequently also ensures that transmission occurs more quietly and easily than in the prior art. There is also an elastic belt transmission and no longer a complicated transmission resulting from rigid guide rods.

According to a further development, the toothed belt wheels have the same diameter and are arranged on either side of the associated jaw carrier, so as to ensure a reliable belt transmission.

In order that the rotary shafts of the two facing sealing devices and consequently ultimately also the belt transmission takes place through the sun wheel and planet wheel in such a way that the two transverse sealing jaws always perform an opposing movement, whose movement path, instantaneous speed and instantaneous acceleration in each case have the same amount, according to a preferred development the rotary shafts of the contrarotating jaw carriers on opposite sides of the film tube to be sealed are driven by means of a common, endless driving belt. Thus, there is no longer any complicated transmission by means of several gears, as in the prior art, so that this drive can also be more easily replaced and is also quieter than the known transmission by gears.

In order to be able to easily implement this common driving of the rotary shafts of the two cooperating sealing devices by means of the common driving belt, the latter is preferably an endless, closed double toothed belt. According to a further development, the common driving belt is in each case located on each pin end of the pivot pins arranged symmetrically to the sealing area, the two driving belts being driven by means of a common drive motor for synchronizing the rotary movement. The radially serrated inside and outside of the driving belt is guided, for the purpose of a simple implementation of this transmission by means of double toothed belts, by toothed belt wheels connected in rotation to the shafts, as well as tension and return pulleys. This makes it possible to modify the centre distance of the two pivot pins of the sealing devices in simple manner, which was not the case with the known transmission using gears. Correspondingly it is also possible to seal other materials, e.g. materials which are difficult to process, in a simple manner, because as a result of the modification of the centre distance the straight working section between the transverse sealing jaws can be modified.

Whereas the known transverse sealing jaws have a mechanically resilient mounting or bearing by means of springs on the jaw carrier, in the means according to the invention, it is preferable for the radial spacing of the transverse sealing jaws with respect to the jaw carrier to be variable in the direction of the sealing area by means of a pneumatic cylinder, so that the transverse sealing jars can be radially advanced or displaced. This e.g. makes it possible to so space the pivot pins of the sealing devices, that the engagement of the heating faces of the transverse sealing jaws during the straight working section is only possible through the advance by means of the pneumatic cylinder. Thus, diverging from the fundamental circular movement of the jaw carrier and consequently the transverse sealing jaws, the latter are moved forwards, so that as a result of the pneumatic cylinder there can be a clearly defined sealing on the working section. Moreover, as a result of the sudden advance of the transverse sealing jaws by means of the pneumatic cylinder, there is a compression of the film tube to be sealed, so that pretensioners are no longer required. As a result of this pronounced radial or, in the case of a vertical working section, horizontal component, the film tubes do not stick together so quickly, because a prior contact between the transverse sealing jaw and film tube has been avoided. There is also a cleaner sealing action due to a reduction in the time during which the transverse sealing jaw and tube are in contact. Due to the fact that the transverse sealing jaws are advanced by means of the pneumatic cylinder, an adaptation to different film materials can be easily achieved. Preferably, the advance of the transverse sealing jaws with respect to the jaw carrier is approximately 10 mm. The pressure in the pneumatic cylinder for producing a constant pressure force is variable in controlled manner during sealing. Thus, during sealing the pressing force is controlled in constant manner, in that the pressure in the pneumatic cylinder is modified. This permits an active displacement of the transverse sealing jaw with respect to its jaw carrier and there is an optimum mutual engagement of the heating faces of the transverse sealing jaws. The jaw pressure can easily be kept constant over the entire sealing section.

BRIEF DESCRIPTION OF THE DRAWINGS

Further advantages and features of the invention can be gathered from the claims and following description of an embodiment of the invention and with reference to the attached drawings, wherein show;

DETAILED DESCRIPTION OF THE DRAWINGS

Figure 1:
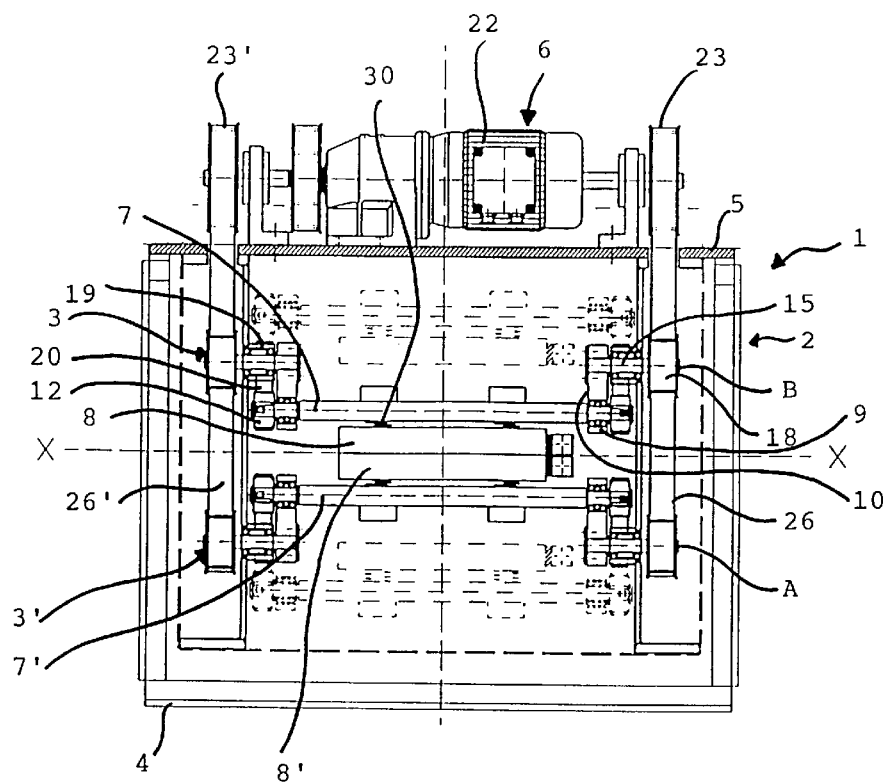
FIG. 1 A plan view of the transverse sealing jaw chair of an inventive flow pack machine.

According to FIG. 1 the inventive flow pack machine 1 has a jaw chair with two oppositely moving sealing devices 3, 3'. The working or sealing area 29 formed centrally between the two sealing devices 3, 3' is indicated by the line X—X in the represented embodiment. The sealing devices 3, 3' are located within a protective case 4, whose one side is closed by a front panel 5. On the side of the front panel 5 remote from the protective case 4 is provided the drive unit 6 for the sealing devices 3, 3'.

Figure 7:
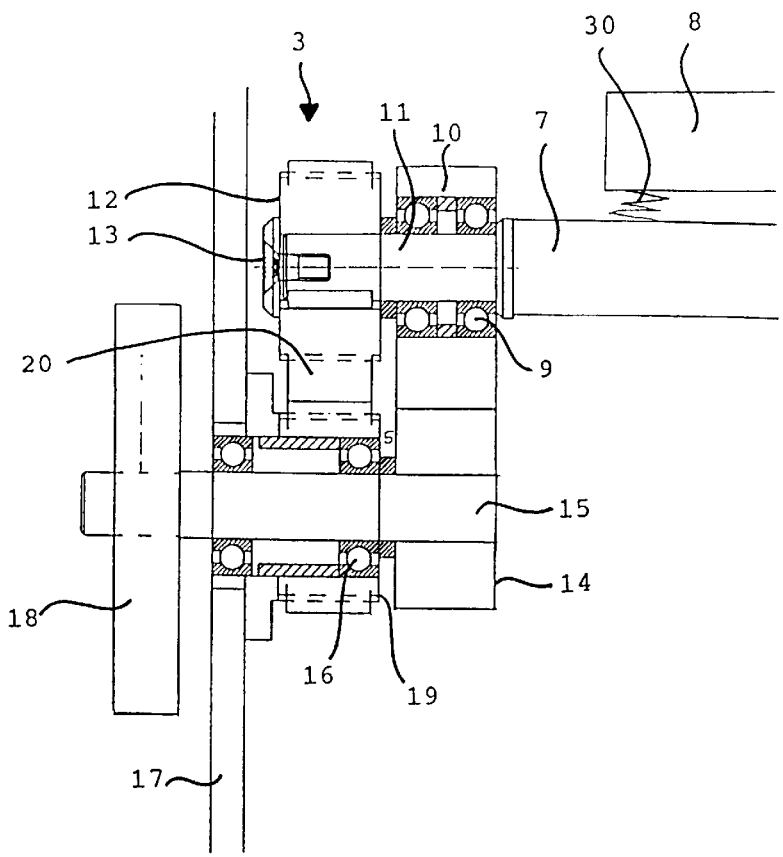
FIG. 7 A larger scale partial view of the transverse sealing jaw carrier crank of FIG. 1.

As can be gathered from FIGS. 1 and 7, each sealing device 3 or 3' has a jaw carrier 7, 7', on which is in each case arranged in radially displaceable manner a transverse sealing jaw 8, 8'. As the sealing devices 3, 3' have an identical construction and are symmetrical, the invention is subsequently illustrated by means of the sealing device 3.

The ends of the jaw carriers 7 are in each case mounted in rotary manner by means of ball bearings 9 (cf. FIG. 7) in guide rods or cranks 10, the jaw carriers 7 passing through said guide rods 10 by means of a shaft 11. On the free end of said shaft 11 is mounted in fixed manner a toothed belt wheel 12 and is fixed by means of an element 13.

Whereas on one end of the crank 10 the jaw holder 7 is mounted in rotary manner, its other end 14 is fixed to the pivot pin 15 of the sealing device 3. The pivot pin 15 is mounted in rotary manner by means of a ball bearing 16 in a bearing wall 17 and its other end is connected in non-rotary manner to a toothed belt wheel 18. On the pivot pin 15 is mounted, in alignment with the toothed belt wheel 12, a further toothed belt wheel 19 between the bearing wall 17 and crank 10 and is fixed to the bearing wall 17. This sun wheel 19 is connected in rotary manner with the toothed belt wheel 12 serving as the planet wheel by means of an endless, closed toothed belt 20.

Figure 3:
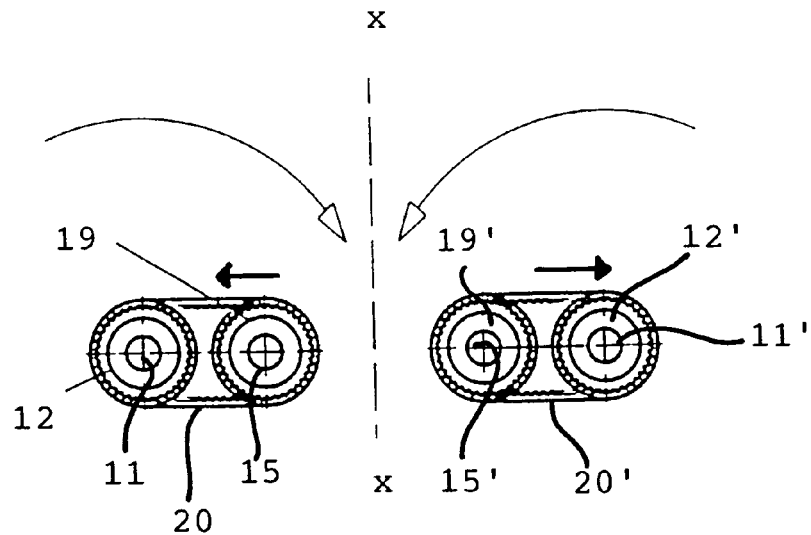
FIG. 3 A side view of the two jaw carrier cranks of the facing sealing devices.
Figure 4:
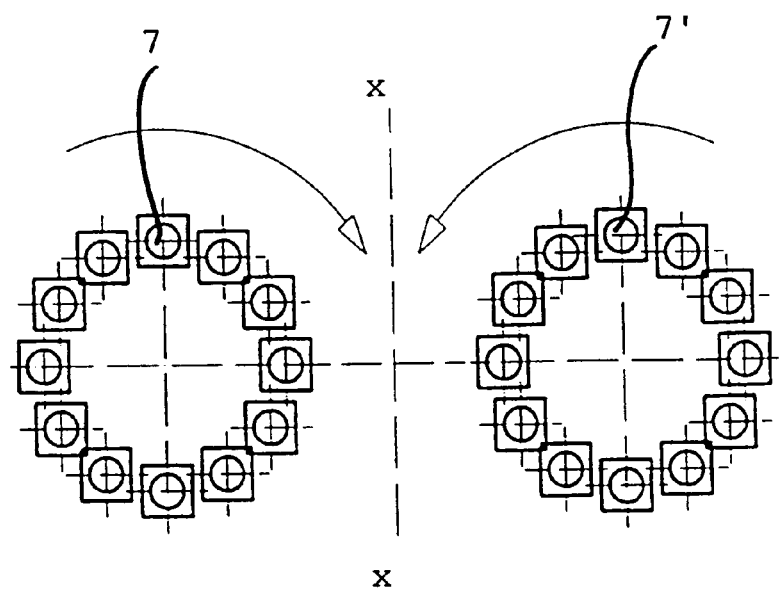
FIG. 4 Diagrammatically the rotary movement of the jaw carrier.
Figure 5:
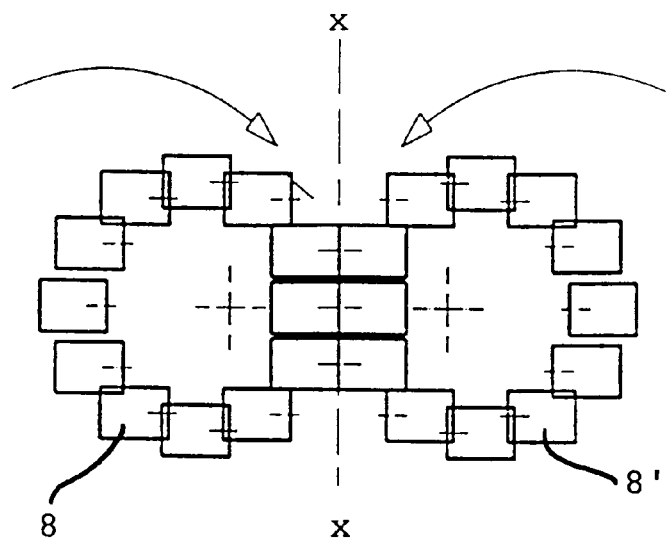
FIG. 5 The transverse sealing jaw rotation.

If the jaw carriers 7 or 7' are now rotated clockwise by means of the pivot pins 15, 15' (cf. FIGS. 3 and 4), the sun wheel 19, 19' always remains fixed, whereas the planet wheel 12, 12' firstly moves clockwise on the represented circular path together with the jaw carriers 7, 7' about the pivot pin 15, 15' and additionally counterclockwise about the sun wheel 19 or 19'. Thus, in accordance with the movement path shown in FIG. 5, the associated transverse sealing jaw 8, 8', throughout the path circulation is only displaced parallel to itself, so that its welding faces always face the sealing area X—X and consequently the film tube. Thus, the transverse sealing jaws 8, 8' with their sealing parts 21, 21' shown in FIG. 8 always engage in full surface, advantageous manner on the film tube to be sealed. Thus, from the outset, the transverse sealing jaws 8, 8' are in engagement on the vertical working section with their entire heating face on the film tube, so that there is no tube burning.

Figure 2:
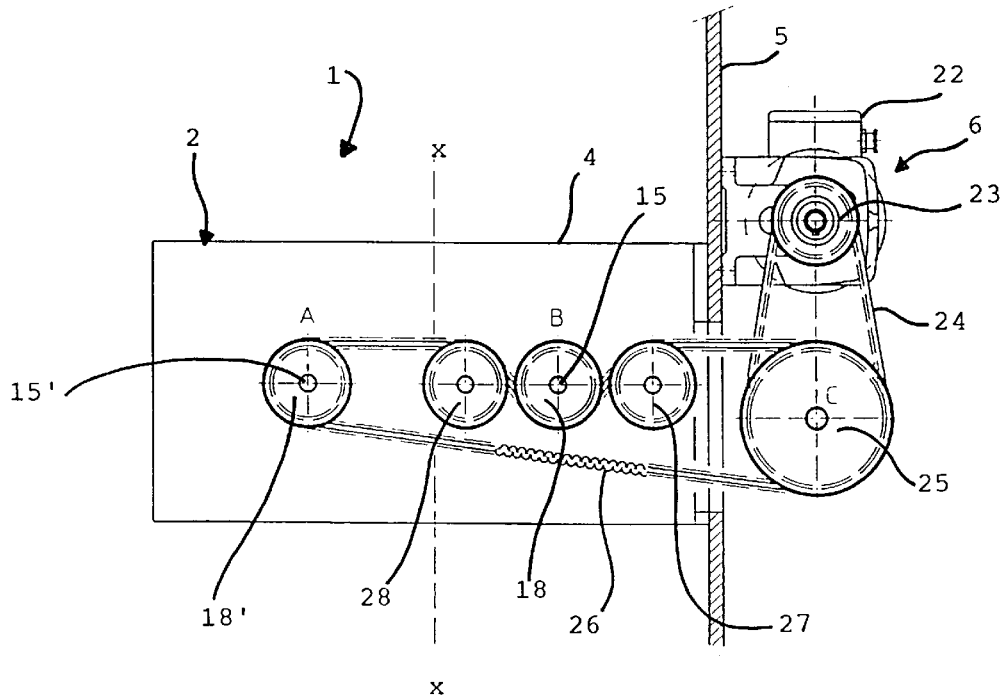
FIG. 2 A side view of the transverse sealing jaw chair of FIG. 1 with the transverse sealing jaw drive.

As is apparent from FIG. 1, the toothed belt wheels 18, 18' are positioned on either side of the sealing devices 3, 3'. For driving purposes the drive unit 6 has a motor 22, e.g. a servomotor, which on either side in each case synchronously drives with the same rotation direction a toothed belt wheel 23, 23'. As shown in FIG. 2, said toothed belt wheel 23 is in rotary connection by means of a one-sided toothed endless belt 24 with a lower toothed belt wheel 25. By means of a double toothed belt 26, 26', said toothed belt wheel 25 in each case drives the driving toothed belt wheels 18, 18' connected to the pivot pins 15, 15'. The double toothed belt 26 is shown as a larger scale detail in FIG. 2 in order to illustrate its contour. The toothed belt wheel 18, B is surrounded on either side by a tension or deviating pulley 27, 28. As a result of said tension or deviating pulleys 27, 28 the toothed belt wheel 18, B and the toothed belt wheel 18' A contrarotate, as is necessary for an opposing rotary movement of the sealing devices 3, 3'. As a result of said double toothed belt transmission, the toothed belt wheels B and A have in each case the same amount with regards to their movement section, their instantaneous speed and their instantaneous acceleration. This ensures a reliable, synchronous and opposing movement.

Figure 6:
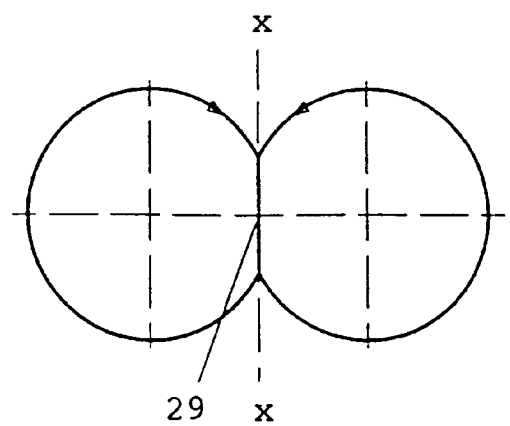
FIG. 6 The path of the sealing devices traversed during a rotation.
Figure 9:
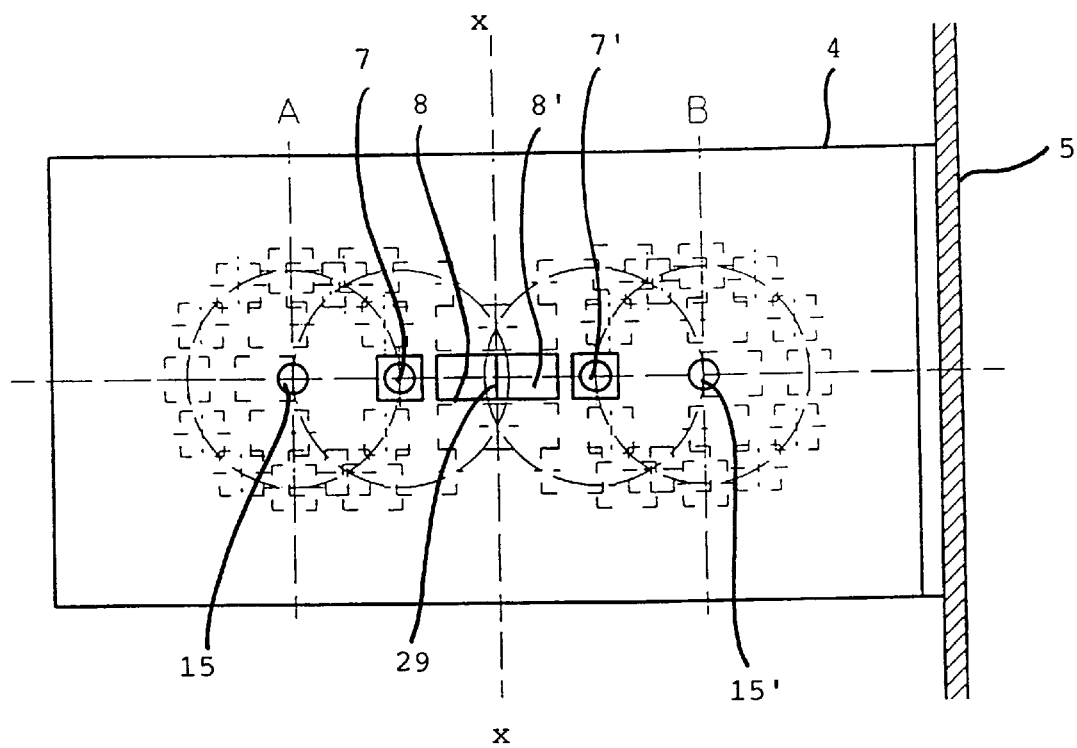
FIG. 9 A diagrammatic representation of the curved sectors traversed by the jaw carrier and transverse sealing jaw.

FIG. 6 shows the movement path of the transverse sealing jaws 8, 8'. As can be gathered from both FIGS. 6 and 9, the transverse sealing jaws 8, 8' initially perform a circular path, which over the length of the sealing section 29 passes into a vertical, linear working section. If the transverse sealing jaws 8, 8' are flexibly mounted by means of covering springs 30 on the jaw carriers 7, 7', as shown in FIGS. 1 and 7, as a result of the mutual engagement of the heating faces of their sealing parts, they are forced back counter to the spring action in the direction of the jaw carriers 7, 7', diverging from the overlapping movement path in the sealing area 29.

Figure 8:
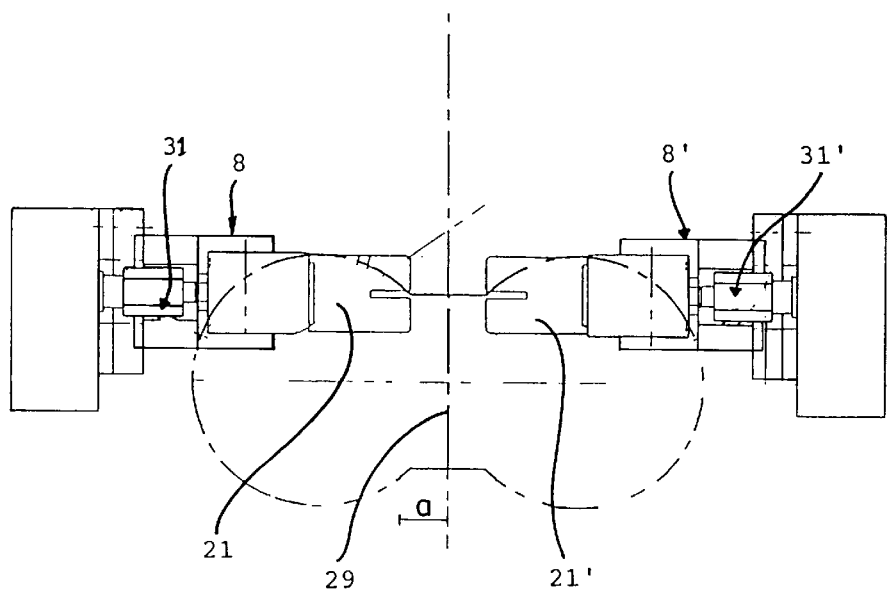
FIG. 8 A diagrammatic representation of two transverse sealing jaws as well as the movement path traversed between them.

Thus, according to the embodiment of FIG. 8, the movement paths of the sealing jaws 8, 8' do not overlap in the sealing area 29 and are instead advanced or moved forward by a pneumatic cylinder 31, 31' by a distance a (approximately 10 mm) in the direction of the sealing area 29 and the opposite transverse sealing jaw. The pneumatic cylinders 31, 31' can be regulated, which permits the attaining of a constant sealing force throughout the sealing section 29. As the transverse sealing jaws 8, 8' suddenly compress the film tube to be sealed due to the sudden advance through the pneumatic cylinders 31, 31', pretensioning means are no longer necessary for this purpose. The jaw pressure is constant, due to the controllability, over the entire sealing section 29, which takes place through a modification of the pressure in the pneumatic cylinder 31, 31'.

We claim:

1. A form-fill-seal machine with at least two transverse sealing jaws positioned at opposite sides of a film tube to be sealed, at least two jaw carriers, the sealing jaws being mounted on the jaw carriers for cyclical rotation on circular paths toward and away from each other, at least two guide rods, each guide rod for mounting in a rotary manner each jaw carrier, a rotary shaft connected to each jaw carrier and passing through a guide rod, a bearing wall, at least two pivot pins, each pivot pin mounted in the bearing wall and connected to a guide rod, a first toothed belt wheel arranged about each rotary shaft, a second toothed belt wheel arranged around each pivot pin and fixed to the bearing wall, an endless closed toothed belt connecting the first and second toothed belt wheels for mutual rotary connection of the jaw carriers.

2. A Form-fill-seal machine according to claim 1, characterized in that the first and second toothed belt wheels are arranged in mutually aligned manner between the bearing wall and guide rod, the latter being traversed by the jaw carrier.

3. A Form-fill-seal machine according to claim 1, characterized in that the first and second toothed belt wheels have the same diameter.

4. A Form-fill-seal machine according to claim 1, characterized in that the first and second toothed belt wheels and the toothed belt are in each case arranged on either side of the associated jaw carrier.

5. A Form-fill-seal machine according to claim 1, characterized in that the pivot pins of the contrarotating jaw carriers located on opposite sides of the film tube to be sealed are driven by means of a common, endless drive belt.

6. A Form-fill-seal machine according to claim 5, characterized in that the common drive belt is an endless, closed double toothed belt.

7. A Form-fill-seal machine according to claim 6, characterized in that the common drive belt is in each case located at each shaft end of the pivot pins arranged symmetrically to a sealing area between the sealing jaws.

8. A Form-fill-seal machine according to claim 7, characterized in that the two common drive belts are driven synchronously by means of a common drive motor.

9. A Form-fill-seal machine according to claim 5, characterized in that the common drive belt is comprises radially serrated inside and outside surfaces and guided by means of toothed belt wheels connected in rotation with the pivot pins, as well as tension and deviating pulleys.

10. A Form-fill-seal machine according to claim 1, characterized in that the radial spacing between each transverse sealing jaws and each respective jaw carrier is modifiable in the direction between each of a sealing area between the sealing jaws (29).

11. A Form-fill-seal machine according to claim 10, characterized in that the transverse sealing jaws are radially advanceable or displaceable by means of a pneumatic cylinder.

12. A Form-fill-seal machine according to claim 10, characterized in that the advance of each transverse sealing jaw to each respective jaw carrier is approximately 10 mm.

13. A Form-fill-seal machine according to claim 11, characterized in that the pressure in the pneumatic cylinder is variable in controlled manner for producing a constant pressing force during sealing.

* * * * *